United States Patent
Yamashita et al.

(10) Patent No.: US 9,231,450 B2
(45) Date of Patent: Jan. 5, 2016

(54) MOTOR

(71) Applicants: ASMO CO., LTD., Shizuoka (JP);
DENSO CORPORATION, Aichi-ken (JP)

(72) Inventors: Yuuji Yamashita, Toyohashi (JP); Jirou Hayashi, Ama (JP)

(73) Assignees: Asmo Co., Ltd., Shizuoka-ken (JP); Denso Corporation, Aichi-ken (JP)

( * ) Notice: Subject to any disclaimer, the term of this patent is extended or adjusted under 35 U.S.C. 154(b) by 0 days.

(21) Appl. No.: 14/468,500

(22) Filed: Aug. 26, 2014

(65) Prior Publication Data
US 2015/0084478 A1    Mar. 26, 2015

(30) Foreign Application Priority Data
Sep. 5, 2013    (JP) .................................. 2013-184130

(51) Int. Cl.
*H02K 5/00*    (2006.01)
*H02K 5/04*    (2006.01)

(52) U.S. Cl.
CPC ... *H02K 5/04* (2013.01); *H02K 5/00* (2013.01)

(58) Field of Classification Search
CPC ....................................................... H02K 1/18
USPC ................................................... 310/216.114
See application file for complete search history.

(56) References Cited

U.S. PATENT DOCUMENTS

| | | | |
|---|---|---|---|
| 4,441,042 A * | 4/1984 | Colwell | 310/91 |
| 6,057,621 A | 5/2000 | Suzuki et al. | |
| 7,414,339 B2 * | 8/2008 | Kitamura et al. | 310/68 D |
| 7,495,360 B2 * | 2/2009 | Imai et al. | 310/71 |
| 2008/0048533 A1 * | 2/2008 | Umeda et al. | 310/68 D |
| 2010/0090561 A1 * | 4/2010 | Leroy et al. | 310/216.114 |

FOREIGN PATENT DOCUMENTS

JP    11-146616    5/1999

* cited by examiner

*Primary Examiner* — Naishadh Desai
(74) *Attorney, Agent, or Firm* — Patterson Thuente Pedersen, P.A.

(57) ABSTRACT

A stator core is sandwiched between a first frame and a second frame. A fastening member fastens the first frame and the second frame. The first frame includes a ring flange that is in contact with an attachment surface of the motor attachment portion. The flange includes a fixing portion fixed to the attachment surface and a fastening portion, which receives fastening force by the fastening member. The first frame includes a deform suppression portion for suppressing deformation of the fixing member when the fastening member is fastened.

7 Claims, 5 Drawing Sheets

MOTOR

RELATED APPLICATIONS

This application claims benefit of priority of Japanese Application No. 2013-184130, filed Sep. 5, 2013, said application being hereby fully incorporated herein by reference.

BACKGROUND OF THE INVENTION

The present invention relates to a motor.

For example, a conventional motor described in Japanese Laid-Open Patent Publication No. 11-146616 includes a stator core that is sandwiched in an axial direction of the motor between two frames. This structure reduces accuracy of dimension required for manufacturing a motor compared to when the stator core is fixed with a housing shaped to be a cylindrical tube by press-fitting or shrinkage-fitting. Accordingly, the above structure facilitates manufacturing of the motor.

For example, it is assumed that the two frames are coupled to each other with a fastening member such as a through bolt, which is inserted to the two frames. The fastening member extends at a position located radially outside the outer peripheral surface of the stator core. However, such a fixing structure using the fastening member may deform the frames when the fastening member fastens the two frames. When one of the frames of the motor is assembled with an attachment portion in a state in which the frames are deformed, the motor inclines relative to the attachment portion so that the motor is unstable relative to the attachment portion. The motor assembled with the attachment portion in an unstable manner causes generation of abnormal noise during the driving of the motor.

SUMMARY OF THE INVENTION

It is an objective of the present invention to provide a motor that is assembled with a motor attachment portion in a stable manner.

To achieve forgoing objective, a motor according to one aspect of the present invention includes: a first frame assembled with a motor attachment portion; a second frame; a stator core sandwiched between the first frame and the second frame; and a fastening member that fastens the first frame and the second frame. The first frame includes a ring flange that extends radially outward and extends along a whole circumference of the first frame. The flange is in contact with an attachment surface of the motor attachment portion. The flange includes a fixing portion fixed to the attachment surface and a fastening portion, which receives fastening force by the fastening member. The first frame includes a deform suppression portion for suppressing deformation of the fixing member when the fastening member is fastened.

A motor according to further aspect of the present invention includes: a first frame assembled with a motor attachment portion; a second frame; a stator core sandwiched between the first frame and the second frame; and a fastening member that fastens the first frame and the second frame. The first frame includes a ring flange that extends radially outward and extends along a whole circumference of the first frame. The flange is in contact with an attachment surface of the motor attachment portion. The flange includes a small diameter portion, a fixing portion, and a fastening portion. The fixing portion extends radially outward from the small diameter portion and fixed to the attachment surface. The fastening portion is arranged in the small diameter portion and receives fastening force by the fastening member.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereafter, one embodiment of a motor will now be described.

Figure 1:
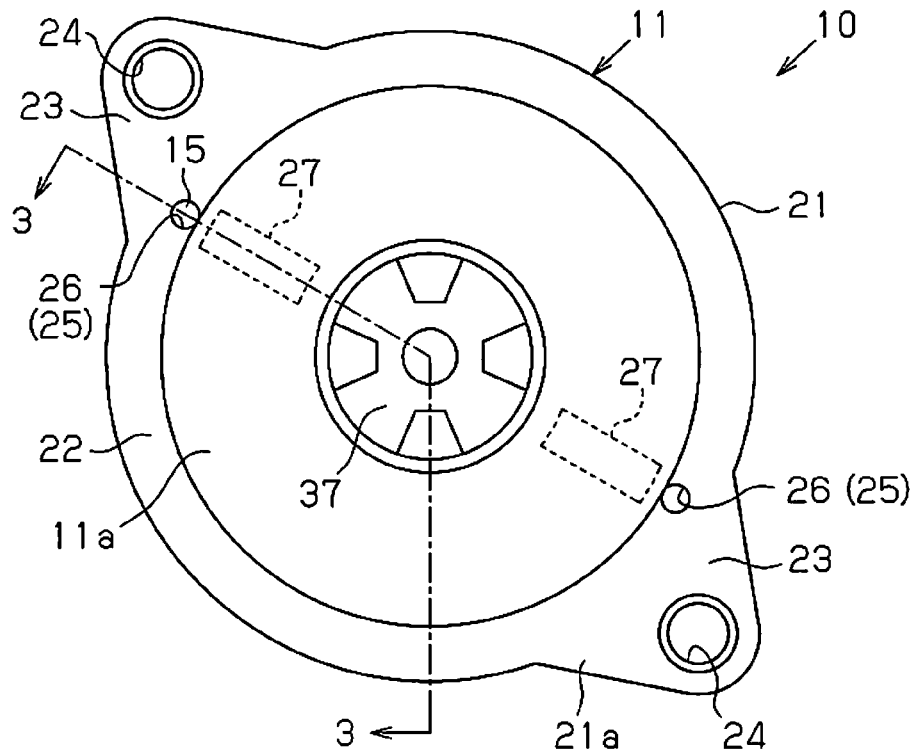
FIG. 1 is a plan view of a motor according to one embodiment of the present invention.
Figure 3:
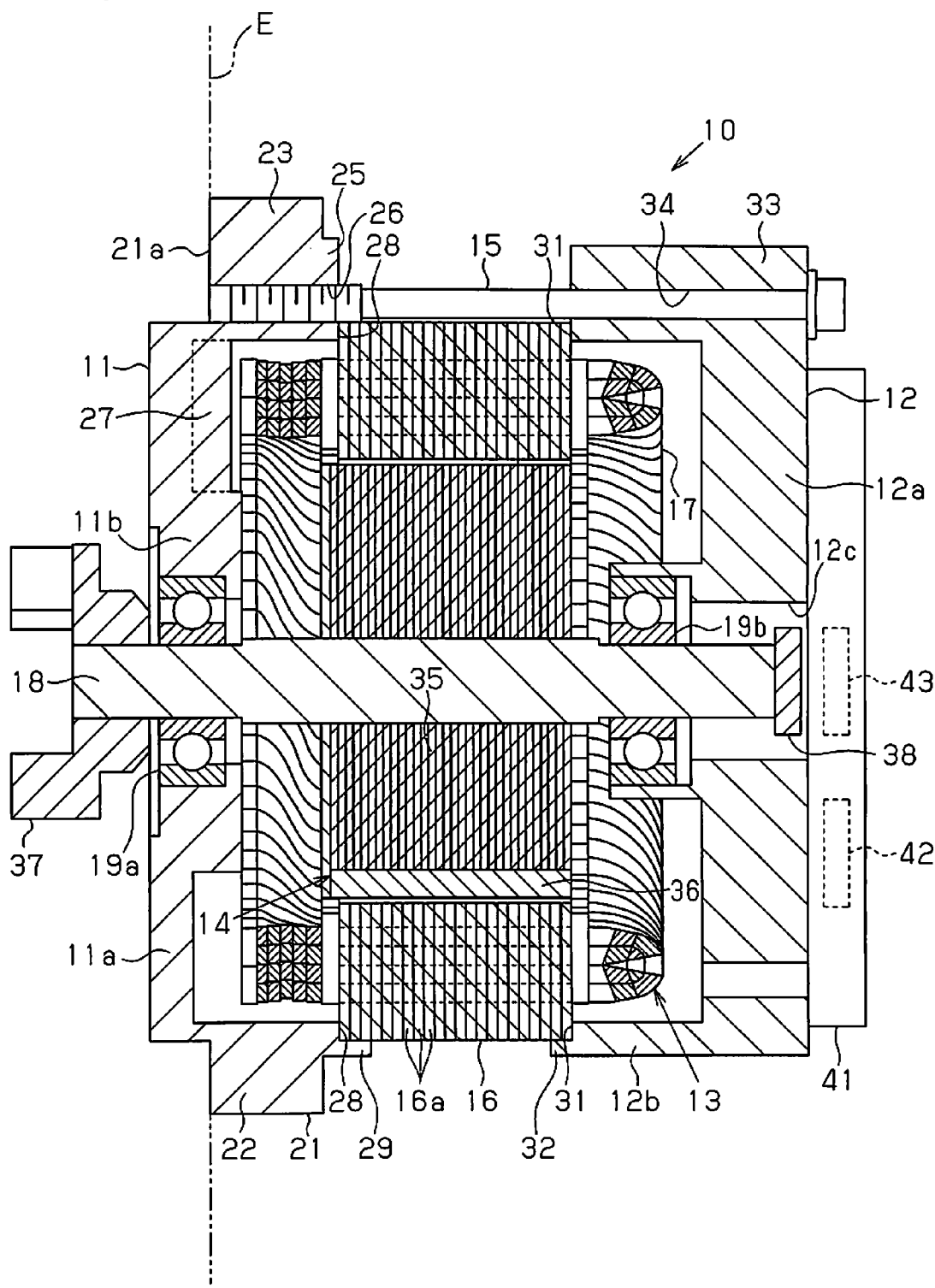
FIG. 3 is a cross-sectional view taken along line 3-3 of FIG. 1.

A motor 10 shown in FIGS. 1 and 3 is assembled with an electric power steering device or the like. The motor 10 includes a front frame 11 (first frame), a rear frame 12 (second frame), a ring shaped stator 13, and a rotor 14. The stator 13 is sandwiched in an axial direction of the motor 10 between the front frame 11 and the rear frame 12. The rotor 14 is arranged inside the stator 13.

Each of the frames 11, 12 is formed of a metallic material such as aluminum, steel or the like. The front frame 11 holds a portion of the motor that is close to an output portion (a joint 37 discussed below) in the axial direction. The rear frame 12 holds a portion of the motor 10 that is opposite to the output portion in the axial direction. The front frame 11 is fixed to an attachment surface E of a motor attachment portion such as the electric power steering device to which the motor 10 is assembled. The frames 11 and 12 are fixed to each other with a through bolt 15 (fastening member), which extends at a position located radially outside the stator 13.

As shown in FIG. 3, the stator 13 includes a stator core 16 shaped to be a generally cylindrical tube and a coil 17 wound around the stator core 16. The stator core 16 includes a plurality of core sheets 16a, which is punched out from a steel plate by a press machining. The core sheets 16a are stacked to each other in the axial direction and swaged to each other so that integrated stator core 16 is obtained. The stator core 16 has opposed two axial end faces that extend perpendicular to the axial direction.

The front frame 11 is shaped to be a cylindrical tube and has a bottom portion 11a. A central portion of the bottom portion 11a includes a bearing receiving portion 11b, which receives a bearing 19a. The bearing 19a axially supports the rotation shaft 18 of the rotor 14. An outer peripheral surface of the front frame 11 has a flat shaped flange 21, which contacts with the attachment surface E. The flange 21 extends radially outward from the outer peripheral surface of the front frame 11.

As shown in FIG. 1, the flange 21 extends along a whole circumference of the front frame 11. The flange 21 has an axial outer surface (an end face opposite to an end face close to the stator core) serving as a contacting surface 21a that contacts with the attachment surface E in the axial direction of the motor. The contacting surface 21a has a flat shape that extends perpendicular to an axis of the motor.

The flange 21 includes a circular ring portion 22 (small diameter portion) and a pair of fixing portions 23 that project radially outward from the circular ring portion 22. When viewing in the axial direction, an outer peripheral surface of the circular ring portion 22 forms a circular arc that extends around the axis of the motor. When viewing in the axial direction, the fixing portion 23 forms a generally triangle having a width that extends along a peripheral direction. The width of the triangle decreases radially outward. The pair of the fixing portions 23 is point-symmetric with respect to the axis of the motor. The contacting surface 21a extends over the circular ring portion 22 and the fixing portions 23.

Each of the fixing portions 23 has a circumferential center portion through which a screw insertion hole 24 extends in the axial direction. A screw (not shown) inserted to the screw insertion hole 24 threadably engages with the attachment surface E. This engagement enables the front frame 11 to be fixed with the attachment surface E.

Figure 2:
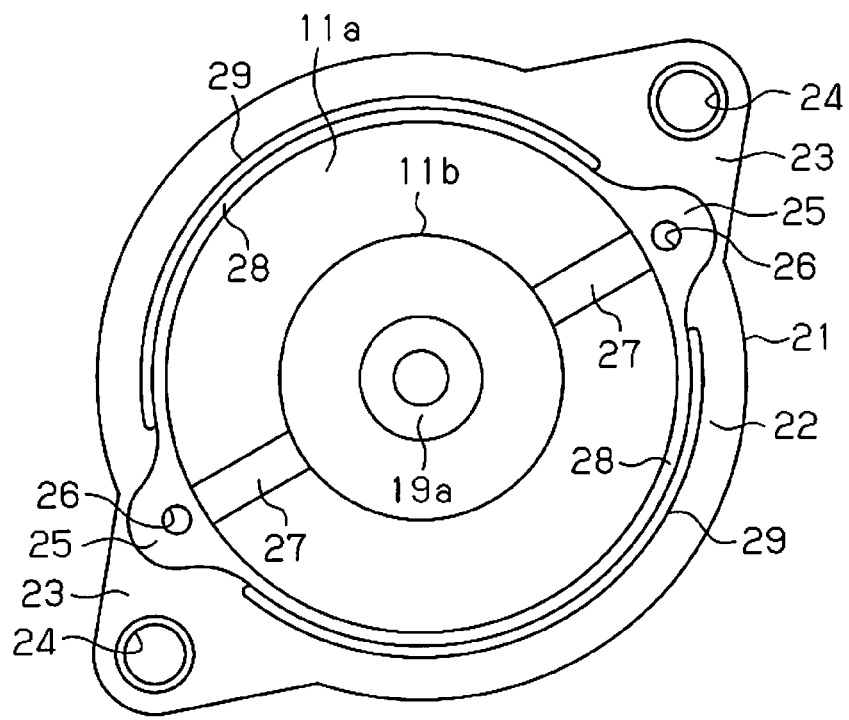
FIG. 2 is a plan view of a front frame shown in FIG. 1 as viewed from a stator core.

As shown in FIGS. 2 and 3, each of the fixing portions 23 has a front fastening portion 25 (fastening portion) that projects in the axial direction by a small amount from the surface of the fixing portion 23, which is close to the stator core 16. The front fastening portion 25 is shaped to be a generally triangle that projects radially outward when viewing in the axial direction (see FIG. 2). The front fastening portion 25 has an axially inner end surface (an end surface close to the rear frame 12) that is located closer to the rear frame than an axially inner end surface of the fixing portion 23. In other words, the front fastening portion 25 has a thickness in the axial direction that is greater than a thickness of the fixing portion 23 in the axial direction.

The front fastening portion 25 has a circumferential center portion having a bolt fixing hole 26 (fastening hole). A distal end of the through bolt 15 threadably engages with the bolt fixing hole 26. The bolt fixing hole 26 is arranged at a position (displaced position) located in the circumferential width of the fixing portion 23, which is shaped to be triangle. The bolt fixing hole 26 is offset in the peripheral direction from the screw insertion hole 24 (see FIG. 2). A length defined between the axis of the motor and the axis of the bolt fixing hole 26 is shorter than a length between the axis of the motor and the axis of the screw insertion hole 24. In other words, the bolt fixing hole 26 is arranged at a position located radially inside the screw insertion hole 24. The bolt fixing holes 26 are arranged at two 180° opposing positions defined about the peripheral direction. The bolt fixing holes 26 extend through the front fastening portion 25 in the axial direction.

The axially inner end surface of the bottom portion 11a (the end surface close to the stator core 16) of the front frame 11 has a pair of reinforcement ribs 27 (deform suppression portions). The reinforcement ribs 27 are arranged at positions that respectively correspond to the bolt fixing holes 26 in the circumferential direction. The reinforcement ribs 27 linearly extend in the radial direction from an inner peripheral surface of the front frame 11 to the bearing receiving portion 11b. Each of the reinforcement ribs 27 is arranged at a position that is proximal to and radially inside the bolt fixing hole 26 when viewing in the axial direction (see FIG. 2). In other words, when viewing in the axial direction, the bolt fixing holes 26 and the reinforcement ribs 27 are arranged on a straight line extending along the radial direction. The reinforcement rib 27 has a circumferential width that is greater than a diameter of the bolt fixing hole 26. The reinforcement rib 27 has an axial end surface that is located at a position axially inside the contacting surface 21a of the flange 21 (position close to the stator core 16).

An axial inner portion of the front frame 11 has a core holding surface 28 shaped to be a ring. The core holding surface 28 contacts in the axial direction an entire outer peripheral portion of one axial end surface of the stator core 16 in the circumferential direction. The core holding surface 28 has a flat shape that extends perpendicular to the axis of the motor. The core holding surface 28 has an outer periphery holding wall 29 that is shaped to be a circular arc and projects in the axial direction. The outer periphery holding wall 29 contacts with an outer peripheral surface of the stator core 16. The outer periphery holding wall 29 may face the outer peripheral surface of the stator core 16 in the radial direction with a small clearance defined in between. The outer periphery holding wall 29 is divided at positions respectively corresponding to the front fastening portions 25 (see FIG. 2). The axially inner end surface (end surface close to the rear frame 12) of the front fastening portion 25 is flush with and continues to the core holding surface 28 at the divided positions of the outer periphery holding wall 29.

As shown in FIG. 3, the rear frame 12 is shaped to be a cylindrical tube and has a bottom portion 12a. The bottom portion 12a includes a central portion at which a bearing 19b that axially supports the rotation shaft 18 is arranged. An outer peripheral wall 12b of the rear frame 12 includes a distal end portion (an end portion located axially inside). The distal end portion includes a stator core holding structure, which is similar to a structure formed in the front frame 11. In other words, the distal end portion of the outer peripheral wall 12b of the rear frame 12 includes a core holding surface 31 and an outer periphery holding wall 32, which are respectively similar to the core holding surface 28 and the outer periphery holding wall 29.

The outer peripheral wall 12b of the rear frame 12 includes two rear fastening portions 33 that project radially outward. The rear fastening portions 33 respectively face two front fastening portions 25 in the axial direction. A bolt insertion hole 34 extends through each of the rear fastening portions 33. The through bolt 15 is inserted to the bolt insertion hole 34 in the axial direction. The distal end of the through bolt 15 threadably engages with the bolt fixing hole 26 of the front fastening portion 25. The front fastening portion 25 and the rear fastening portion 33 receive a fastening force generated by the through bolt 15 that acts axially inward. In other words, the fastening force acts in a direction in which the front fastening portion 25 and the rear fastening portion 33 face towards each other. According to this structure, the frames 11 and 12 are coupled to each other in a state in which the stator core 16 is sandwiched in between.

Thus, the outer peripheral portion of the stator core 16 is sandwiched in the axial direction by the core holding surfaces 28 and 31 of the frames 11 and 12. The axial end portions of the stator core 16 are held in the radial direction by the outer periphery holding walls 29 and 32 of the frames 11 and 12. The outer peripheral surface of the stator core 16 exposes outside through a gap defined in the axial direction between the frames 11 and 12. The outer peripheral surface of the stator core 16 includes engagement portions (not shown) located at positions respectively correspond to the divided portions of the outer periphery holding walls 29 and 32. The engagement portions engage with the through bolts 15 in the radial direction and the peripheral direction.

The rotor 14 includes a rotation shaft 18, which is axially supported by the bearings 19a and 19b, a rotor core 35, which is fixed to the rotation shaft 18, and a plurality of magnets 36, which is fixed to an outer peripheral surface of the rotor core 35. The rotor core 35 is arranged inside the stator core 16. The outer peripheral surface of the rotor core 35 faces an inner peripheral surface of the stator core 16 in the radial direction. A distal end portion (left distal end portion in FIG. 3) of the rotation shaft 18 extends through the front frame 11 and projects toward the outside of the motor 10. The projected portion of the rotation shaft 18 has a joint 37 that transmits rotation of the rotation shaft 18 to the electric power steering device.

The bottom portion 12a of the rear frame 12 has a central portion through which a through hole 12c extends through in the axial direction. A basal end portion of the rotation shaft 18 is inserted to the through hole 12c. The basal end portion of the rotation shaft 18 has a magnet for detection 38 that is integrally rotatable with the rotation shaft 18. The magnet for detection 38 is arranged in the through hole 12c.

The rear frame 12 has an axial outer surface (an end face opposite to an end face close to the stator) to which a substrate 41 is fixed. The substrate 41 includes a control circuit 42 that controls driving of the motor 10 and a rotation detection element 43 that is arranged to face the magnet for detection 38 in the axial direction. The rotation detection element 43 is, for example, a hall IC. The rotation detection element 43 detects variations in magnetic field due to rotation of the magnet for detection 38. In accordance with output signals from the rotation detection element 43, the control circuit 42 obtains rotation information including a rotation angle, a rotation direction, a rotation speed, and the like of the rotation shaft 18. The control circuit 42 controls control current that is supplied to the coil 17 of the stator 13 in accordance with the rotation information of the rotation shaft 18. This configuration enables the rotation shaft 18 to be rotated in a desirable manner.

In this embodiment, the rear frame 12 has an axial length that is longer than the axial length of the front frame 11. In other words, a length between the stator 13 and the substrate 41, which is fixed to the rear frame 12 is longer than the length between the stator 13 and the attachment surface E to which the front frame 11 is fixed. According to this structure, heat generated in the stator 13 is likely to be transferred to the attachment surface E (electric power steering device) through the front frame 11. This structure suppresses the temperature of the substrate 41 from being raised, and suppresses the control circuit 42 or the like from being damaged by the heat.

Subsequently, discussion will be made on the operation in this embodiment.

As discussed above, the front fastening portion 25 and the rear fastening portion 33 receive the fastening force from the through bolt 15 that acts axially inward. The fastening force enables the outer peripheral portion of the opposed two axial end faces of the stator core 16 to be sandwiched in the axial direction by the core holding surfaces 28 and 31 of the frames 11 and 12. In the front frame 11 according to this embodiment, since the front fastening portion 25 is arranged in the fixing portion 23, the fastening force by the through bolt 15 is likely to act on the fixing portion 23. In addition, since the reinforcement rib 27 is arranged at a position of the bottom portion 11a that is located radially inside the fixing portion 23, the bottom portion 11a is partially thick in the axial direction. This structure suppresses the fixing portion 23 from being deformed axially inward by the fastening force from the through bolt 15. As a result, the motor 10 can be attached to the attachment surface E in a stable manner in which the motor 10 does not incline with respect to the attachment surface E. This structure suppresses generation of the abnormal noise during the driving of the motor.

In addition, according to the present embodiment, the reinforcement rib 27 is arranged at a portion radially inside the bolt fixing hole 26 to which greatest fastening force is applied. Accordingly, the fastening force by the through bolt 15 is likely to act on the reinforcement rib 27. This structure effectively suppresses the deformation in the fixing portion 23.

In addition, according to the present embodiment, the outer periphery holding wall 29 is not arranged at a portion of the front frame 11 that corresponds to the front fastening portion 25. The axially inner end surface (the end surface close to the rear frame 12) of the front fastening portion 25 is flush with the core holding surface 28 at the portion at which the outer periphery holding wall 29 is not arranged. This structure decreases the distance between the through bolt 15 (bolt fixing hole 26) and the core holding surface 28 in the radial direction. Accordingly, this structure reduces moment acting about a contacting portion between the stator core 16 and the core holding surface 28 that is generated by the fastening force from the through bolt 15.

Subsequently, discussion will be made on the advantages in this embodiment.

(1) The front frame 11 includes the ring flange that extends radially outward and extends along a whole circumference of the front frame 11. The flange 21 contacts with the motor attachment portion or the attachment surface E of the electric power steering device. The flange 21 increases a contacting area of the motor 10 with respect to the attachment surface E. This structure enables the motor 10 to be assembled with the attachment surface E in a stable manner. In addition, the front frame 11 includes the reinforcement rib 27 for suppressing the deformation of the fixing portion 23 due to the fastening force by the through bolt 15. This structure enables the fixing portion 23 to be kept in a normal shape. As a result, the motor 10 can be assembled with the attachment surface E in more stable manner.

(2) The fixing portion 23 projects radially outward from the circular ring portion 22 of the flange 21. Accordingly, this structure secures a radial width of the fixing portion 23 that is necessary for fixing the fixing portion 23 to the attachment surface E. In addition, the circular ring portion 22, which is a portion of the flange 21 other than the fixing portion 23 is reduced in the size in the radial direction. As a result, the size of the flange 21 in the radial direction is reduced, and consequently the size of the front frame 11 in the radial direction is reduced.

(3) The fixing portion 23 forms a generally triangle having a width that extends along the peripheral direction. The width of the triangle decreases toward radially outward. Accordingly, the strength of the fixing portion 23 can be secured, while the size of the flange 21 is reduced.

(4) The front fastening portion 25 is arranged in the fixing portion 23. Accordingly, the width of the front fastening portion 25 in the radial direction that is necessary for fastening the through bolt 15 can be secured. In addition, since the front fastening portion 25 is not arranged in the circular ring portion 22, the circular ring portion 22 can be kept in a small size.

(5) The fixing portion 23 includes the screw insertion hole 24 to which the screw (not shown) is inserted. The screw threadably engages with the attachment surface E. The front fastening portion 25 includes the bolt fixing hole 26 to which the through bolt 15 is threadably engaged. The bolt fixing hole 26 is arranged at a position located radially inside the screw insertion hole 24. The position of the bolt fixing hole 26 is offset in the peripheral direction relative to the fixing portion 23. According to this structure, the bolt fixing hole 26 is arranged radially inside the screw insertion hole 24. This structure enables the through bolt 15 to be located at a position close to the stator core 16. Accordingly, this structure reduces the moment acting about the contacting portion between the stator core 16 and the core holding surface 28 that is generated by the fastening force from the through bolt 15. As a result, the deformation of the fixing portion 23 is further suppressed. In addition, since the bolt fixing hole 26 is offset in the peripheral direction relative to the screw insertion hole 24, the distance between the screw insertion hole 24 and the bolt fixing hole 26 can be secured. As a result, the screw insertion hole 24 is not adversely affected by the fastening force from the through bolt 15.

(6) The reinforcement rib 27 is arranged on the axial inner surface of the bottom portion 11a of the front frame 11. Accordingly, the rigidity of the front frame 11 is improved so that the deformation of the fixing portion 23 is suppressed in a preferable manner. In addition, the deform suppression portion that suppresses the deformation in the fixing portion 23 is formed by a simple structure such that the reinforcement rib 27 is merely arranged at the bottom portion 11a of the front frame 11.

(7) The reinforcement rib 27 is arranged radially inside the front fastening portion 25, which receives the fastening force from the through bolt 15. Accordingly, the deformation in the fixing portion 23 is more effectively suppressed.

The above embodiment may be modified as described below.

In the above embodiment, the reinforcement rib 27, which serves as the deform suppression portion is arranged to suppress the deformation in the fixing portion 23 due to the fastening force from the through bolt 15. The deform suppression portion is not limited to this structure.

Figure 4:
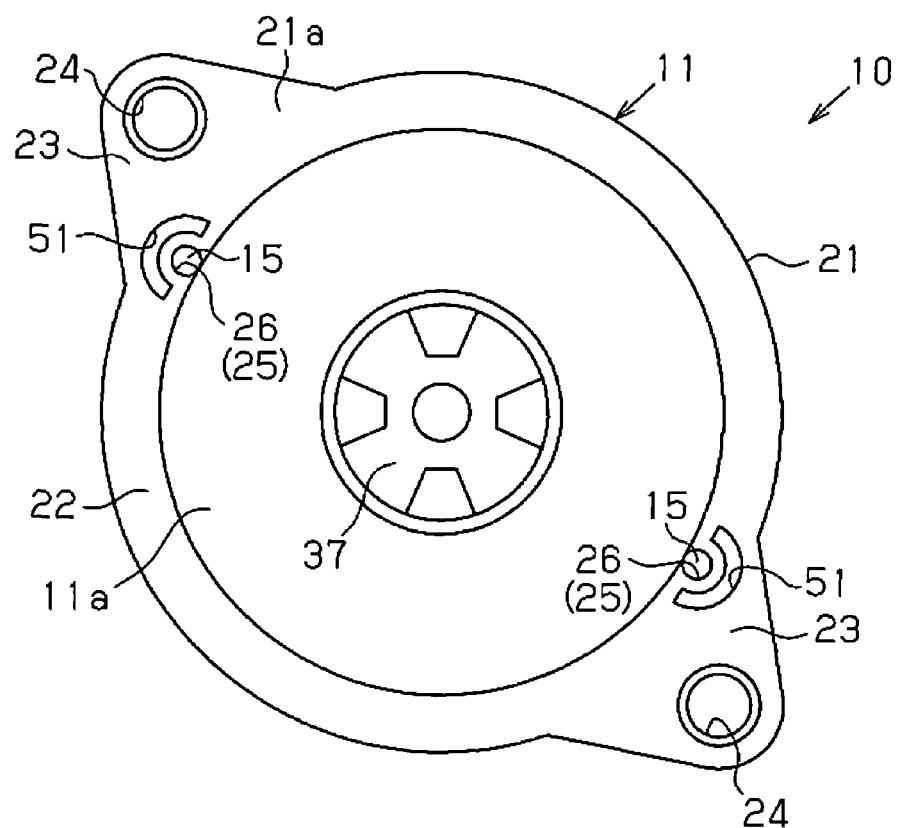
FIG. 4 is a plan view of a motor in a further example.
Figure 5:
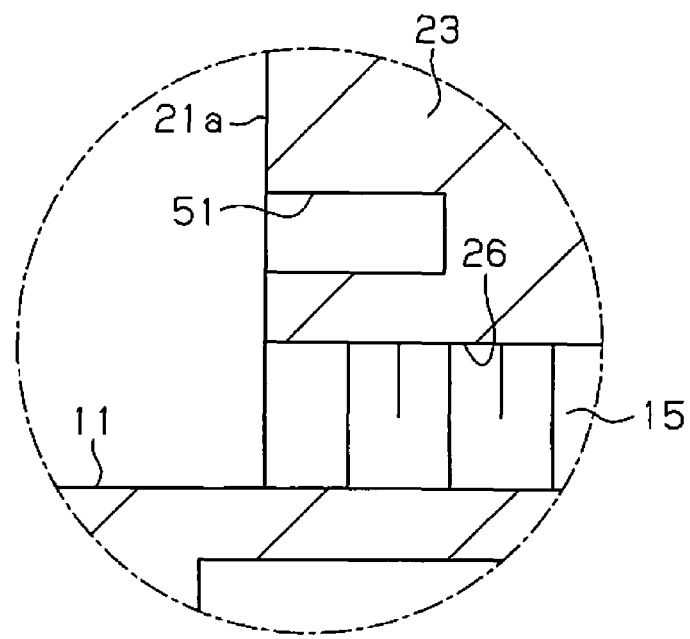
FIG. 5 is an enlarged cross-sectional view of a part of the motor shown in FIG. 4.

For example, as shown in FIGS. 4 and 5, a slit 51 (a depressed portion) serving as the deform suppression portion may be formed between the bolt fixing hole 26 and the screw insertion hole 24. In the example shown in FIGS. 4 and 5, the slit 51 is formed to be depressed from an axial outer end surface (the contacting surface 21a) of the fixing portion 23. The slit 51 is located at a position of the fixing portion 23 that corresponds to a radially outer position of the front fastening portion 25. The slit 51 is shaped to be a semicircular arc that covers a portion of the fixing portion 23 proximal to the bolt fixing hole 26, that is, a portion of the fixing portion 23 located radially outside the bolt fixing hole 26 when viewing in the axial direction. The slit 51 is located in the circumferential width of the fixing portion 23, which is shaped to be a generally triangle.

According to this structure, a thin wall portion is formed between the bolt fixing hole 26 and the screw insertion hole 24 by forming the slit 51. If the portion of the fixing portion 23 (the front fastening portion 25) proximal to the bolt fixing hole 26 is deformed due to the fastening force by the through bolt 15, the deformation is not likely to be adversely affected on a portion of the fixing portion 23 that is proximal to the screw insertion hole 24. In other words, the deformation due to the fastening force by the through bolt 15 is likely to remain in the front fastening portion 25. Accordingly, the deformation in the portion of the fixing portion 23 that is proximal to the screw insertion hole 24 is suppressed. In addition, the slit 51 serving as the deform suppression portion arranged at the fixing portion 23 in this structure effectively suppresses the deformation in the fixing portion 23.

Figure 6:
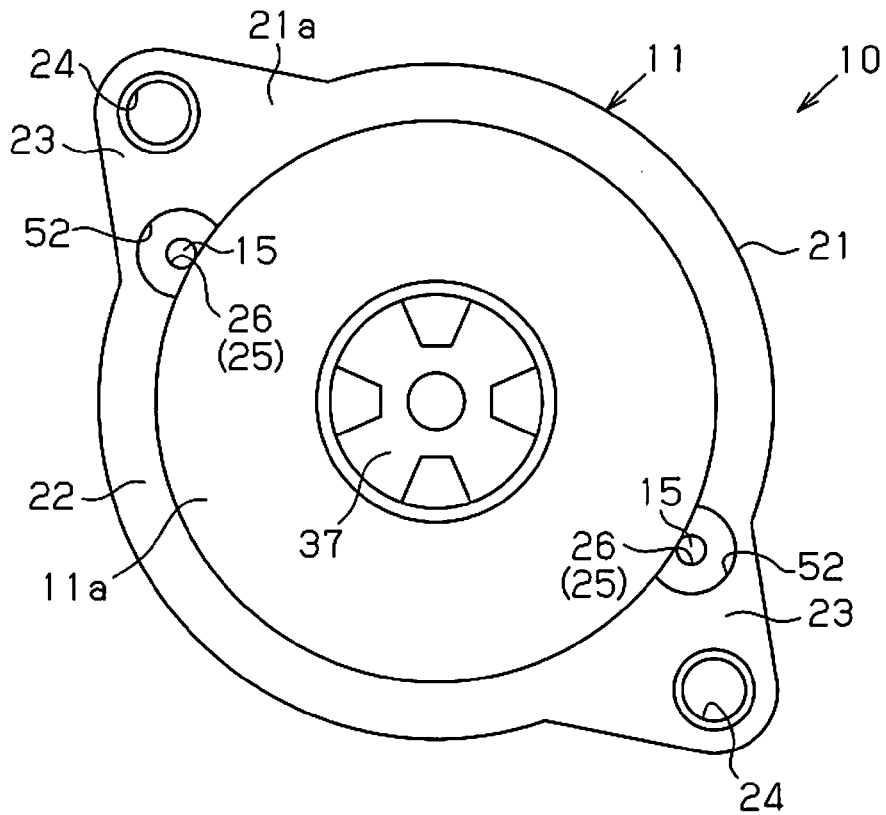
FIG. 6 is a plan view of a motor in a further example.
Figure 7:
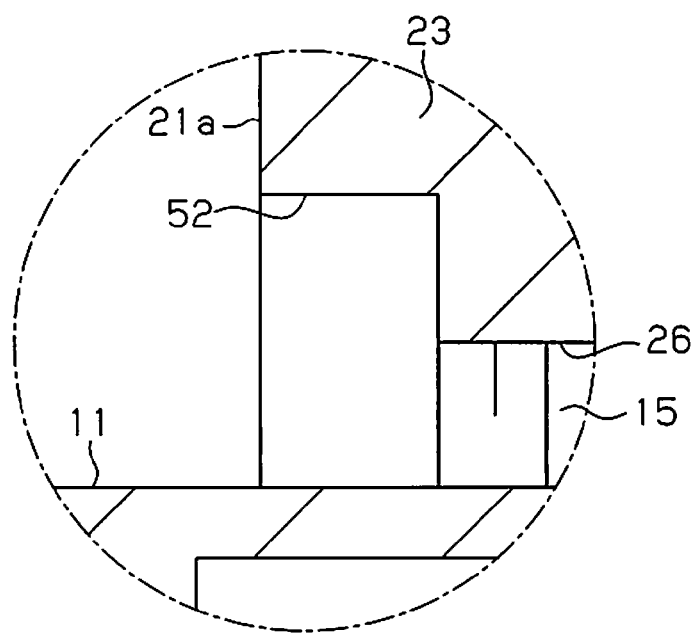
FIG. 7 is an enlarged cross-sectional view of a part of the motor shown in FIG. 6.

Alternately, for example as shown in FIGS. 6 and 7, a recessed portion 52 serving as the deform suppression portion may be formed at a portion of the fixing portion 23 that incorporates the bolt fixing hole 26 and to be depressed from the axial outer end surface (the contacting surface 21a) of the fixing portion 23. The recessed portion 52 has an inner peripheral surface that forms a circular arc coaxial with the bolt fixing hole 26. The inner peripheral surface of the recessed portion 52 has a diameter that is greater than the diameter of the bolt fixing hole 26. In other words, the recessed portion 52 is configured so that the recessed portion 52 is arranged at least at a portion between the bolt fixing hole 26 and the screw insertion hole 24.

According to this structure, similar to the example shown in FIG. 4 as discussed above, the thin wall portion is formed between the bolt fixing hole 26 and the screw insertion hole 24 by forming the recessed portion 52. Accordingly, the deformation due to the fastening force by the through bolt 15 is likely to remain in the front fastening portion 25. As a result, the deformation in the portion of the fixing portion 23 that is proximal to the screw insertion hole 24 can be suppressed. In addition, the recessed portion 52 serving as the deform suppression portion arranged at the fixing portion 23 effectively suppresses the deformation in the fixing portion 23.

Alternately, additionally arranging the slit 51 shown in FIG. 4 or the recessed portion 52 shown in FIG. 6 to the structure in the above embodiment suppresses the deformation in the fixing portion 23 due to the fastening force by the through bolt 15 in a further improved manner.

Figure 8:
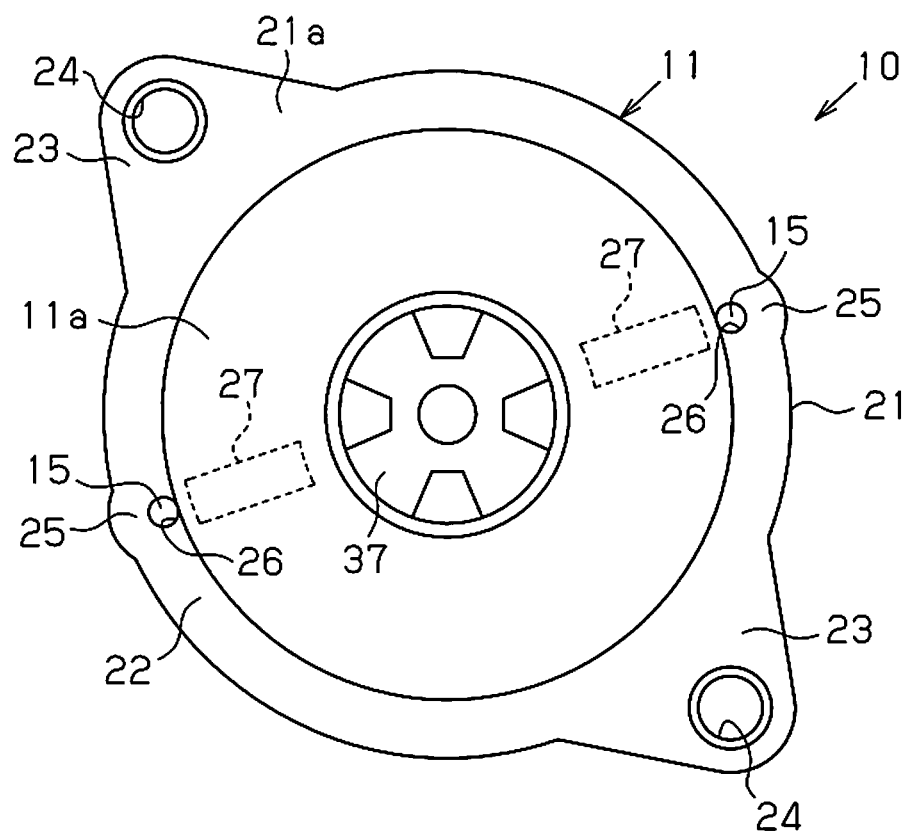
FIG. 8 is a plan view of a motor in a further example.

In the above embodiment, the front fastening portion 25 (the bolt fixing hole 26) is arranged at the fixing portion 23. The front fastening portion 25 may be arranged at the circular ring portion 22 of the flange 21 as shown in FIG. 8. According to this structure, the front fastening portion 25 (the bolt fixing hole 26) is arranged at a portion separated from the fixing portion 23. This structure suppresses the deformation in the fixing portion 23 due to the fastening force by the through bolt 15. In addition, this structure is preferable for the structure in which the number of the fixing portion 23 differs from the number of the front fastening portion 25 (the rear fastening portion 33.) Alternately, although the reinforcement rib 27 is arranged at a position radially inside the bolt fixing hole 26 in the example shown in FIG. 8, the reinforcement rib 27 may be arranged at a position radially inside the fixing portion 23. Alternately, the front fastening portion 25 in the example shown in FIG. 8 may additionally include the slit 51 shown in FIG. 4 or the recessed portion 52 shown in FIG. 6. These structures suppress the deformation in the fixing portion 23 in a further improved manner.

Alternately, the reinforcement rib 27 (deform suppression portion) may be omitted from the example shown in FIG. 8. According to this structure, since the front fastening portion 25 is arranged at the circular ring portion similar to the example shown in FIG. 8, the front fastening portion 25 is arranged at a portion separated from the fixing portion 23. Accordingly, the deformation in the fixing portion 23 due to the fastening force by the through bolt 15 is suppressed.

In the above embodiment, the flange 21 includes the circular ring portion 22 serving as the small diameter portion and the fixing portion 23 projecting radially outward from the circular ring portion 22. The flange 21 is not limited to this structure and may have an outer diameter that is unchanged on the entire circumference.

In the above embodiment, the through bolt 15 has a head arranged at the rear frame 12 and a distal end threadably engaging with the front frame 11. The through bolt 15 is not limited to this structure and may have a reversed design. That is, the through bolt 15 may have a head arranged at the front frame 11 and a distal end threadably engaging with the rear frame 12.

In the above embodiment, the rear frame 12 does not necessarily include the outer periphery holding wall 32. The rear frame 12 may not include the outer periphery holding wall 32.

In the above embodiment, the through bolt 15 serves as the fastening member. The fastening member is not limited to this structure and may be a member other than the through bolt 15 as long as the fastening member fastens the frames 11 and 12.

In the above embodiment, the present invention is embodied in the motor 10 used for the electric power steering device, but may be embodied in a motor used for a device other than the electric power steering device.

The invention claimed is:

1. A motor comprising:
   a first frame assembled with a motor attachment portion;
   a second frame;
   a stator core sandwiched between the first frame and the second frame; and
   a fastening member that fastens the first frame and the second frame, wherein
   the first frame includes a ring flange that extends radially outward and extends along a whole circumference of the first frame,
   the ring flange is in contact with an attachment surface of the motor attachment portion,
   the ring flange includes a fixing portion fixed to the attachment surface and a fastening portion, which receives fastening force by the fastening member,
   the first frame includes a deform suppression portion for suppressing deformation of the fixing portion when the fastening member is fastened,
   the ring flange includes a small diameter portion,
   the fixing portion projects radially outward from the small diameter portion,
   the fixing portion forms a generally triangle having a width that extends along a peripheral direction, wherein the width of the triangle decreases toward radially outward,
   the fastening portion is arranged in the fixing portion,
   the fixing portion includes a screw insertion hole to which a screw is inserted, wherein the screw threadably engages with the attachment surface,
   the fastening portion includes a fastening hole to which the fastening member is inserted or threadably engaged, and
   the fastening hole is arranged at a position radially inside the screw insertion hole, wherein the position of the fastening hole is offset in the peripheral direction from the fixing portion.

2. The motor according to claim 1, wherein
   the fastening portion is arranged in the fixing portion.

3. The motor according to claim 1, wherein
   the deform suppression portion is arranged in the fixing portion.

4. The motor according to claim 1, wherein
   the fastening portion is arranged in the small diameter portion.

5. The motor according to claim 1, wherein
   the first frame is shaped to be a tube and has a bottom portion, and
   the deform suppression portion includes a reinforcement rib arranged on an axial inner surface of the bottom portion.

6. The motor according to claim 5, wherein
   the reinforcement rib is arranged at a position radially inside the fastening portion.

7. A motor comprising:
   a first frame assembled with a motor attachment portion;
   a second frame;
   a stator core sandwiched between the first frame and the second frame; and
   a fastening member that fastens the first frame and the second frame, wherein
   the first frame includes a ring flange that extends radially outward and extends along a whole circumference of the first frame,
   the ring flange is in contact with an attachment surface of the motor attachment portion,
   the ring flange includes a fixing portion fixed to the attachment surface and a fastening portion, which receives fastening force by the fastening member,
   the first frame includes a deform suppression portion for suppressing deformation of the fixing portion when the fastening member is fastened,
   the fixing portion includes a screw insertion hole to which a screw is inserted, wherein the screw threadably engages with the attachment surface,
   the fastening portion includes a fastening hole to which the fastening member is inserted or threadably engaged, and
   the deform suppression portion includes a recessed portion formed between the fastening hole and the screw insertion hole.

* * * * *